United States Patent [19]

Rao et al.

[11] 4,159,908

[45] Jul. 3, 1979

[54] ALKALI METAL CONTAINING BATTERY GRID LEAD ALLOY

[75] Inventors: M. Vikram Rao, Princeton Junction; George S. Foerster, Hightstown, both of N.J.; Ranna K. Hebbar, Bombay, India

[73] Assignee: N L Industries, Inc., New York, N.Y.

[21] Appl. No.: 933,425

[22] Filed: Aug. 14, 1978

[51] Int. Cl.$^2$ .............................................. C22F 11/10
[52] U.S. Cl. ................................. 75/167; 75/166 C; 75/166 D; 75/166 E
[58] Field of Search ............ 75/166 B, 166 C, 166 D, 75/167, 166 E

[56] References Cited

U.S. PATENT DOCUMENTS

| 3,637,440 | 1/1972 | Foerster et al. | 148/11.5 R |
|---|---|---|---|
| 3,801,310 | 4/1974 | Nijhawan | 75/166 C |
| 3,990,893 | 11/1976 | Nijhawan et al. | 75/166 C |
| 3,993,480 | 11/1976 | Ueberschaer et al. | 75/166 C |

FOREIGN PATENT DOCUMENTS 38-25008  11/1963  Japan ......................................... 75/167

Primary Examiner—L. Dewayne Rutledge
Assistant Examiner—Upendra Roy
Attorney, Agent, or Firm—Gerald K. White

[57] ABSTRACT

An alkali metal containing low antimonial content lead alloy characterized by improved ductility for use as an electric storage battery grid or in acidic environments suitably contains from 0.5% to 3.0% Sb, 0.01% to 0.7% As, 0.001% to 0.7% Sn, 0.001% to 0.15% Cu, 0.001% to 0.015% S or 0.001% to 0.05% Se or admixtures thereof and 0.001% to 0.05% of an alkali metal. Battery grids made from the alloy are resistant to electrochemical corrosion, gassing, and grid growth as well as exhibiting improved bend ductility.

11 Claims, No Drawings

ALKALI METAL CONTAINING BATTERY GRID LEAD ALLOY

The invention generally relates to an alkali metal containing, low antimonial content lead alloy having utility as an electric storage battery grid as well as for in use in acidic environments such as sulfuric acid. The alloy constitues an improvement to prior low antimonial alloys from the standpoints of improvements to ductility and acidic corrosion resistance in the as-cast state and improvement to ductility, electrochemical corrosion and gassing when in the form of a battery grid.

Antimonial grid alloys for use in automotive batteries have, in recent years, exhibited a trend toward the use of lower antimony contents. Antimony is primarily added to impart strength to the alloys to facilitate handling upon casting of the grid and during pasting operations. Today, grids only 50 mils thick are being cast and antimony levels have dropped from the historical 11% to as low as 2% to 2.5%. A direct consequence of this development has been a remarkable improvement in the overall performance of the lead acid battery including significant reduction in water loss.

A number of patents, for example, U.S. Pat. Nos. 3,801,310; 3,879,217; 3,912,537; 3,990,893; and 3,993,480 have described the use of low antimony levels in alloys designed for battery grid production. These patents recognize the desirability of a low antimony lead alloy; however, the softness and lack of castability due to the low antimony content has heretofore been compensated for by the addition of other elements such as selenium and silver, to improve these properties. U.S. Pat. No. 3,993,480 describes an alloy containing 0.5 to 3.5% antimony with quantities of arsenic, tin, silver, copper, selenium and sulfur. U.S. Pat. No. 3,801,310, for example, describes an alloy containing 1 to 3.5% antimony and additional quantities of arsenic, tin, selenium and silver. In addition, copending Application Ser. No. 840,830, filed Oct. 11, 1977, by Ranna K. Hebbar, M. Vikram Rao, and George S. Foerster also deals with a low antimonial lead battery grid alloy. None of the above mentioned patents or application discusses alkali metal additions to the grid alloy.

On the other hand, sodium and lithium have been added to certain lead and lead-antimony alloys for purposes of deoxidation or for other reasons not related to properties normally associated with battery grid alloys. Such patents include U.S. Pat. Nos. 293,886; 438,116; 782,401; 1,269,000; 2,138,614; British Pat. Nos. 566,579 and 582,009; and Japanese Pat. No. 2500863.

In accordance with this invention, it has been discovered that the addition of an alkali metal or admixtures thereof in amounts ranging from about 0.001% to 0.05% to low antimonial lead alloys leads to significant improvements in ductility and acid corrosion resistance in the as-cast state and in ductility, electrochemical corrosion resistance and resistance to gassing when utilized as a grid for lead acid batteries. Typical alkali metals include lithium, sodium, and potassium. In particular, the invention may be advantageously employed in connection with maintenance-free batteries.

The lead alloy of the invention generally comprises from 0.5% to 3.0% antimony, from 0.01% to 0.7% arsenic, from 0.001% to 0.7% tin, from 0.001% to 0.15% copper, from 0.001% to 0.015% sulfur or from 0.001% to 0.05% selenium or admixtures thereof, from 0.001% to 0.05% of an alkali metal or admixtures thereof, balance lead. For reasons that will become apparent in a later portion of the description of the invention, it is a preferred embodiment of the invention to maintain the compositional ranges of the alloy from 1.2% to 2.2% antimony, from 0.05% to 0.30% arsenic, from 0.05% to 0.3% tin, from 0.02% to 0.09% copper, from 0.002% to 0.01% sulfur or 0.015% to 0.025% selenium or admixtures thereof, from 0.003% to 0.01% of an alkali metal or admixtures thereof, balance essentially lead.

The principal characteristics required for an alloy used for battery cell grids are mechanical strength, castability, corrosion resistance, and low gassing. The grid should be ductile and capable of withstanding handling and the stresses encountered during pasting. The alloy should be easily castable as represented by high casting rates and low reject percentages. Resistance to corrosion in service is also a requisite. Low gassing rates are important because little or no water addition is made during the guaranteed lifetime of the battery. These properties are achieved in the alloy of this invention by the proper selection of the alloy constituents and the amount included in the alloy.

Strengthening or hardening of high antimonial lead alloys is obtained by a dispersion of the eutectic (antimony rich) phase. The quantity of such phase decreases with decreasing antimony content. For example, a 4% Sb alloy will have approximately 15% eutectic material, whereas 3% and 2% Sb alloys, respectively, have only 11% and 5%. Thus, the lower Sb alloys do not contain sufficient amounts of eutectic material to strengthen them adequately.

Low antimony lead alloys, therefore, must be additionally hardened by the process of particulate strengthening which involves creating a dispersion of hard particles throughout the matrix to impede the progress of the deformation front. The particles can be produced either during the solidification process (dispersion hardening) in which case the particles are relatively large and provide their hardening action immediately in the as-cast stage, or upon precipitation (precipitation hardening). This latter procedure is described as an aging mechanism because the particles precipitate out of the solid phase over a period of time. The degree of precipitation hardening is a function of time after casting. The exact nature of this aging behavior is dependent upon alloy composition. In the alloy of this invention, arsenic produces dispersion hardening and antimony contributes to precipitation hardening.

The loss of water in a battery during normal use is an important parameter to be considered in the development of improved acid storage battery systems for maintenance-free applications. Total water loss in a battery can be attributed to two major factors, i.e., evaporation and electrolysis. The evaporative component is a function of temperature, time, humidity of the environment and battery case and vent designs. The electrolytic component (the dissociation of water due to electrolysis) is a function of the grid alloy, temperature, total miles driven and driving pattern. The present invention is concerned with the water loss due to electrolysis (known as "gassing").

The phenomenon of gassing occurs when a battery is on charge thus causing the antimony present in the positive plates to leach into the electrolyte and be transferred through the separators to the negative plates. The electrochemical nature of the antimonial ion facilitates its deposition on the negative plates. The presence of antimony on the negative plates increases the propensity for hydrogen gas evolution. The gas is evolved by the dissociation of water molecules present in the electrolyte, resulting in a net water loss.

Antimony should be maintained in amounts ranging from about 0.5% to 3.0% to achieve a desirable balance between as-cast hardness and gassing rate in combination with the other elements, particularly the alkali metal, of the inventive alloy. It is preferred to maintain antimony between about 1.2% to 2.2% to further optimize the above discussed balance of properties.

Arsenic contributes to hardening or strengthening of the alloy and is included in amounts ranging from about 0.01% to 0.7. It is preferred to limit arsenic contents to from about 0.05% to 0.30% as hardness increases above about 0.30% are rather low and water loss increases with increasing arsenic content in batteries produced using the alloy.

Tin is included in the alloy of the invention for purposes of improving castability due to its beneficial influence upon fluidity. Amounts of from about 0.001% to 0.7% tin are considered to result in adequate castability. Tin in amounts from about 0.05% to 0.3% are typically used as such amounts are sufficient to enhance castability in combination with the other alloying elements.

Sulfur and copper may be added to the alloy for the purpose of grain refinement. Sulfur is believed to promote grain refinement because of the formation of lead sulfide nuclei at the onset of solidification. Copper is believed to provide supportive action due to modification of the solubility of sulfur and therefore affecting the instant at which nuclei are initiated. In the absence of such nuclei, freezing of the alloy will first occur on the cool walls of the mold, and produce a columnar structure. Columnar structure is not desired because it leads to poor castability due to poor metal flow to those portions of the casting mold last to freeze and to nonuniform distribution of antimony, which in turn contributes to increased gassing rates. Proper selection of the grain refining material and the amount used is very important since formation of the nucleating particles too early or too late in the solidification process renders them ineffective. Selection of the grain refiners and the amount used is particularly critical when casting extremely thin battery grids such as those with 28 mil wires. To achieve the above described function sulfur should be included in amounts ranging from about 0.001% to 0.015% and copper from about 0.001% to 0.15%. It is preferred to maintain sulfur from about 0.002% to 0.01% and copper from about 0.02% to 0.09%.

Selenium also serves as a grain refining agent through the formation of lead selenide and thereby serves to enhance castability. Selenium, unlike sulfur, is sufficiently soluble in lead so that concurrent copper additions are not required to enhance effectiveness. This element must be included in the alloy in amounts ranging from about 0.001% to 0.05%, preferably from about 0.015% to 0.025%. It is also within the scope of the invention to include both sulfur (with copper) and selenium in respective amounts effective to result in adequate grain refinement in the alloy of the invention.

It has been discovered that the addition of small quantities, 0.001% to 0.05%, of an alkali metal such as lithium, sodium, potassium, or admixtures thereof in combination with the abovementioned alloying elements substantially reduces gassing to a value considerably below that of the same grid alloy without the alkali metal addition. It is preferred to include alkali metals in amounts ranging from about 0.003% to 0.01% where the alloy is to be used as a battery grid. The upper limit has been found to be adequate for attaining desirable grid properties while the lower limit further ensures the attainment of the properties of the invention. In as much as alkali metals contribute to corrosion resistance improvement in acidic environment, no such upper limit is recommended for non grid applications. Sodium constitutes the preferred alloying element due to its availability and cost. Furthermore, electrochemical corrosion rates during the operation of storage batteries containing grids made of the alloy are significantly lowered when alkali metal additions within the above range are made. Both of these desirable improvements are believed to be related to the adsorbtion of alkali metal atoms onto the freezing interface, thereby causing the segregation of antimony and arsenic to become less pronounced in the resultant casting. A reduction in the concentration of antimony and arsenic rich pockets would be beneficial to corrosion properties because such pockets are more susceptible to corrosive attack and leaching than less rich locations. The reduction of leaching is also believed to be associated with a reduction in gassing. Evidence relating to the reduction of segregation is manifested on both a macro and microscale. Alkali metal additions to antimonial lead alloys dramatically alters the freezing pattern in such a manner that the strong influence upon segregation on a macroscale can be visually observed. For example, it has been noted experimentally that alkali metal additions to lead — 3% antimony alloys changed the morphology from cellular dendritic to cellular. The addition of arsenic, tin, copper, sulfur, and selenium appears to cause a sufficient interaction to mask the macroscopic effect. However, in such case, the improvement in antimony segregation pattern can be clearly observed on a microscale with use of an electron probe micro analyzer.

An additional unexpected result that has been noted is that the alloys of the invention are more ductile, and therefore, less susceptible to brittleness after prolonged storage, than are alloys without the addition of alkali metal within the above described ranges.

The alloy of the invention, in the as-cast metallurgical state, exhibits good tensile ductility and resistance to sulfuric acid attack. These properties are improved by the alkali metal addition. For example, a maximum weight loss of about $7.0 \times 10^{-3} gm/cm^2$ according to the testing procedure described in Example 5 is to be expected when alkali metal additions in accordance with the invention are made.

Battery grids made from the alloy of the invention exhibit improvement in ductility, electrochemical corrosion, gassing, and grid growth when contrasted to battery grids made from the same alloy composition that do not contain the alkali metal addition. For example, the alloys of the invention when cast into battery grids exhibit superior bend ductility as shown in Example 1, an electrochemical corrosion resistance of a maximum of about 0.3% per day as shown in Example 4, a maximum gassing rate at 80° F. of about 0.05 cc/min./cell as shown in Example 3, and a maximum grid growth (a property related to both corrosion and creep) of about 0.02% per day as shown in Example 4. Such combination of properties is representative of an extremely desirable product from both a commercial and technical standpoint.

The following examples serve to further illustrate the invention.

EXAMPLE 1

Battery grids were cast with a lead alloy having the composition 2.05% Sb, 0.27% As, 0.31% Sn, 0.06% Cu, 0.003% S. The grids were subjected to tests to measure ductility. The ductility tests comprised simply rolling up the grid to an approximate inside diameter of ½ inch, unrolling the grid, and rerolling the grid. The improvement in ductility was measured as a function of reduced incidence of breakage, both in the as-cast state and also following passage of seven and fourteen days. Metallic Na was added to the melt and grids were cast, resulting in a residual Na content of 0.005%. The cast grids were subjected to the ductility tests as before and the grids containing Na were found to be more ductile than the others at all conditions.

EXAMPLE 2

The grids of Example 1 were pasted and constructed into 11 plate test battery cells. These were then subjected to electrochemical tests resulting in the generation of Tafel curves. The curves were then analyzed to deduce gassing rates. Table 1 describes the results and it is clearly observed that the gassing of cells constructed with grids containing Na is approximately 28% less than of those made with the alloy without Na.

EXAMPLE 3

A lead alloy containing 1.8% Sb, 0.21% As, 0.25% Sn, 0.05% Cu and 0.004% S was cast into grids. The run was then repeated following the addition of metallic Na, resulting in a residual Na content of 0.007% in the cast grids. Test cells were constructed as in Example 2, and the gassing results are shown in Table 1. It may be observed that the gassing in the alloy containing Na is about 22% less than that in the alloy without Na.

EXAMPLE 4

The cast grids of Example 3 were pasted and constructed into five plate test battery cells. About 50 ppm chloride ions were added to the electrolyte and the temperature was raised to 160° F. to accelerate corrosion. The cells were subjected to 75 mV positive over potential. The cells were periodically removed and the weight loss and grid dimensions were measured. The results are shown in Table 2. The cells with grids containing Na have substantially lower corrosive weight loss and also lower grid growth characteristics.

EXAMPLE 5

A lead alloy containing 2.75% Sb and 0.25% Sn was cast into discs. The discs were machined and subjected to static corrosion testing at 160° F. in sulfuric acid of specific gravity 1.280. At the end of the testing, the discs were washed to remove corrosion products and the weight loss noted. The entire experiment was repeated following the addition of 0.01, 0.05, 0.10 and 0.15% Na. The results reported in Table 3 demonstrate the beneficial influence of Na additions.

TABLE 1

| | Material | Gassing at 80° F. cc/min./cell |
|---|---|---|
| 1) | 2.05% Sb, 0.27% As, 0.31% Sn, .06% Cu, .003% S | 0.065 |
| 2) | Alloy (1) + 0.005%, Na | 0.047 |
| 3) | 1.8% Sb, 0.21% As, 0.25% Sn, 0.05% Cu, 0.004% S | .058 |
| 4) | Alloy (3) + 0.007% Na | .045 |

TABLE 2

| | Material | Corrosion Weight Loss % per day | Corrosion Grid Growth % per day |
|---|---|---|---|
| 1) | 1.8% Sb, 0.21% As, 0.25% Sn, 0.05% Cu, 0.004% S | 0.5 | 0.032 |
| 2) | Alloy (1) + 0.007% Na | 0.2 | 0.012 |

TABLE 3

| | Alloy | Weight Loss $gm/cm^2 \times 10 - 3$ |
|---|---|---|
| 1) | 2.75 Sb, 0.25 Sn | 8.29 |
| 2) | Alloy 1 + 0.01 Na | 6.21 |
| 3) | Alloy 1 + 0.05 Na | 5.06 |
| 4) | Alloy 1 + 0.10 Na | 5.92 |
| 5) | Alloy 1 + 0.15 Na | 3.90 |

We claim:

1. A lead alloy characterized by good ductility and being resistant to corrosion in an acid environment consisting essentially of from 0.5% to 3.0% antimony, from 0.01% to 0.7% arsenic, from 0.001% to 0.7% tin, a member selected from the group consisting of from 0.001% to 0.015% sulfur, from 0.001% to 0.05% selenium, and admixtures thereof, a member selected from the group consisting of from 0.001% to 0.05% of an alkali metal and admixtures thereof, balance essentially lead.

2. The alloy of claim 1 wherein: said alloy contains from 0.001% to 0.05% sodium.

3. The alloy of claim 1 wherein: said antimony content is from 1.2% to 2.2%.

4. The alloy of claim 1 wherein: said arsenic content is from 0.05% to 0.30%.

5. The alloy of claim 1 wherein: said alloy contains from 0.001% to 0.015% sulfur and from 0.001% to 0.15% copper.

6. The alloy of claim 1 wherein: said alloy contains from 0.001% to 0.05% selenium.

7. The alloy of claim 1 wherein: said sodium content if from 0.003% to 0.01%.

8. A lead alloy characterized by good ductility consisting essentially of from 1.2% to 2.2% antimony, from 0.05% to 0.30% arsenic, from 0.05% to 0.3% tin, a member selected from the group consisting of from 0.002% to 0.01% sulfur, from 0.015% to 0.025% selenium, and admixtures thereof, a member selected from the group consisting of from 0.003% to 0.01% of an alkali metal and admixtures thereof, balance essentially lead.

9. The alloy of claim 8 wherein: said alloy contains from 0.003% to 0.01% sodium.

10. The alloy of claim 8 wherein: said alloy contains from 0.02% to 0.09% copper and from 0.002% and 0.01% sulfur.

11. A battery grid having the composition of claims 1, 2, 3, 4, 5, 6, 7, 8, 9, or 10 and having a low gassing rate and good electrochemical resistance.